United States Patent

Sandwick

Patent Number: 4,702,484
Date of Patent: Oct. 27, 1987

[54] COLLET CHUCK WITH INTERNAL AND EXTERNAL WORK STOPS

[76] Inventor: Thomas K. Sandwick, 5585 Collingwood, Kalamazoo, Mich. 49004

[21] Appl. No.: 864,206

[22] Filed: May 19, 1986

[51] Int. Cl.$^4$ ............................................. B23B 31/20
[52] U.S. Cl. .................................... 279/1 S; 279/46 R
[58] Field of Search .................... 279/1 S, 41 R, 46 R; 82/34 C

[56] References Cited

U.S. PATENT DOCUMENTS

| | | | |
|---|---|---|---|
| 2,469,160 | 5/1949 | Evans | 279/1 S |
| 2,502,719 | 4/1950 | Haley et al. | 279/46 |
| 2,871,023 | 1/1959 | McCormick | 279/1 S |
| 3,510,141 | 5/1970 | Dunham | 279/51 |
| 3,720,416 | 3/1973 | Blanchard | 82/34 C |
| 4,505,487 | 3/1985 | Davignon et al. | 279/1 S |

FOREIGN PATENT DOCUMENTS 839727  6/1960  United Kingdom ................ 279/1 S

*Primary Examiner*—Z. R. Bilinsky
*Assistant Examiner*—Daniel W. Howell
*Attorney, Agent, or Firm*—Austin A. Webb

[57] ABSTRACT

A collet chuck with a tubular outer body has an internal tubular collet with cam surfaces at its outer end divided into sections by axial slots. Three or more centering screws are threaded through the outer body and pass through the slots in the collet to engage in radial holes in a cylindrical ring that is internally threaded. A cup shaped cylinder is externally threaded and adjustably threaded through the ring as a first and external stop within the collet. The ring has a chordal slot with a set screw extending through one side to defom the threads and lock the ring relative to the stop. A small central rod is threaded through the bottom of the first stop as an adjustable inner stop and is provided with a lock nut bearing against the bottom of the cup.

6 Claims, 2 Drawing Figures

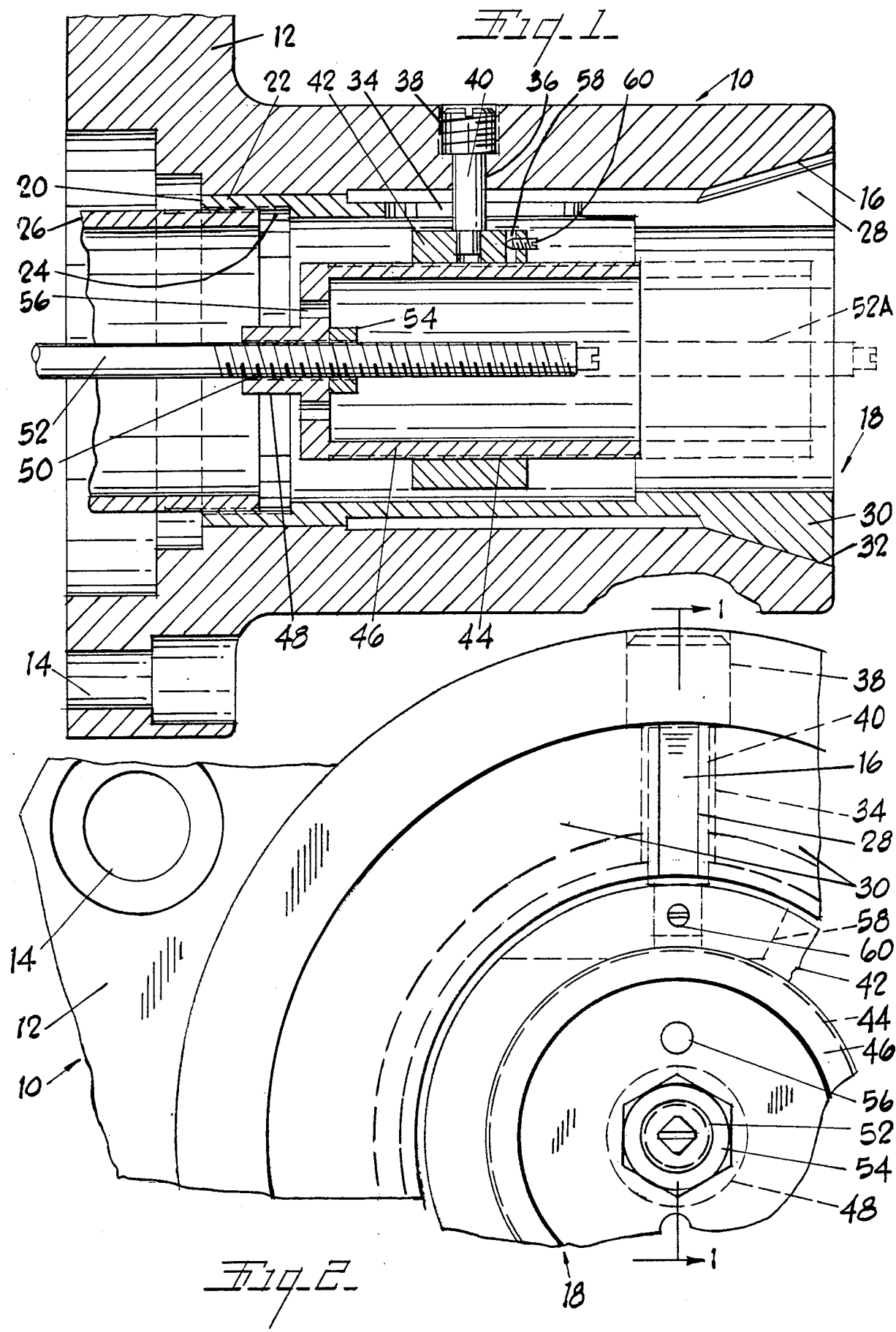

COLLET CHUCK WITH INTERNAL AND EXTERNAL WORK STOPS

DETAILED DESCRIPTION

The drawing, of which there is one sheet, show a preferred form of the invention.

FIG. 1 is a fragmentary longitudinal cross sectional view through the collet, taken along the planes of the broken line 1—1 in FIG. 2.

FIG. 2 is a fragmentary end elevational view of the collet shown in FIG. 1.

The outer collet body indicated generally at 10 has an external flange 12 on its inner end which is adapted to be connected to the spindle of a lathe (not illustrated). A hole for receiving a connecting screw is shown at 14. The outer end of the body has an internally cammed surface 16. Slidably positioned within the body 10 is a tubular collet indicated generally at 18. The cylindrical inner end 20 of the collet slides freely on a mating surface 22 of the body 10, and is internally threaded as at 24 to connect to a tubular chuck actuating element 26. The tubular element 26 extends into the headstock for connection to operating mechanism. The collet is slotted axially from its outer end as at 28 to divide the collet in to angularly spaced gripping fingers 30 which are cammed on their radial outer sides as at 32. The slots 28 are widened along their inner portions as at 34. Work gripping pads (not illustrated) are commonly interchangably connected to the outer ends of the fingers 30 on their radially inner sides.

The foregoing structure is old and common to collet chucks, and no claim is made thereto except in combination with the following structure.

The cylindrical part of the body 10 is provided with radial bores 36 spaced equally with the slots 28 in the collet 18. The bores are tapped at their outer ends as at 38 to receive the threaded heads of centering pins 40. The inner ends of the pins 40 are received in bores formed radially through a ring 42 which fits in clearing relation within the mid-portion of the collet. The inside of the ring 42 is threaded as 44 to adjustably receive and support an externally threaded cup-like work stop member 46. The bottom of the cup member has a boss 48 which is drilled and tapped in the center as at 50. The tapped bore adjustably receives an externally threaded rod-like inner or second work stop 52. A lock nut 54 on the stop rod selectively locks the cup-shaped outer stop in position axially on the rod.

Bores 56 in the bottom of the outer work stop act as tool engaging surfaces to receive a spanner wrench inserted through the open outer end of the collet. The outer end of the stop rod 52 is also shaped to receive tools for adjusting the rod through the outer cup or work stop. The dotted line position of the inner stop rod at 52-A in FIG. 1 indicates how the inner work stop can be adjusted to co-act with the inside of a hollow work piece.

In order to secure and lock the axial position within the centering ring 42, the ring is provided with a slot 58 formed part way through the ring in a chordal fashion and a set-screw 60 extending through the partially severed portion of the ring can be tightened to deflect the grooves in the ring and jamb then on the threads on the outside of the outer stop 46.

When in operation the centering pins 40 drivingly connect the inner collet 18 to the outer body 10 by engagement with the sides of the slots 28 and 34, without interfering with axial movement of the collet to grip or release the work. Alternatively, new or extra slots could be formed through the bases of the gripping fingers but the preferred form illustrated avoids this extra work.

What is claimed to be new and what is desired to be secured by Letters Patent is defined in the following claims:

1. In a collet chuck having a tubular body with means at its inner end adapted to be secured to the spindle of a lathe, and an inwardly converging cam surface at the outer end of its internal surface, and a tubular collet slidably supported within said body and having an actuating means at its inner end, said collet being axially slotted from its outer end to provide plural work gripping fingers, said fingers having external cammed surfaces at their outer ends co-acting with the cam surface of said body, work stop means comprising:
    a cylindrical stop element having a threaded outer surface located centrally within said tubular collet and further having a transverse wall defining a central threaded aperture,
    a rod-like second stop element threadedly engaged through said aperture and adjustably projecting therefrom,
    a cylindrical ring member threadedly engaged with the thread on said first stop element,
    and at least three centering screws threadedly engaged through radial holes provided therefor in spaced relation around said body inwardly of the cammed surface therein,
    said screws having radially abutting and axially interlocking engagement with said ring member and passing through said slots in said collet.

2. A collet chuck as defined in claim 1 in which said first stop element has wrench engaging surfaces engagable through the outer end of said collet for adjusting the stop element along the thread of said ring.

3. A collet chuck as defined in claim 2 in which said ring has at least one chordal slot formed therethrough, and a lock screw threaded axially through the outer end of said ring and into said slot to deform the thread in said ring and lock the ring to said stop element.

4. A collet chuck as defined in claim 1 in which there is a lock nut on said rod on the outer side of said first stop element.

5. A collet chuck as defined in claim 4 in which said first stop element is cup shaped with its bottom forming said transverse wall located inwardly of the body of the chuck.

6. A collet chuck as defined in claim 1 in which said centering screws have inner ends of reduced size received in holes provided therefor in the exterior of said ring member to form the radially abutting and axially inter-locking engagement therebetween.

* * * * *